Sept. 24, 1940.  L. B. JONES  2,215,735
CAR DUMPING MACHINE
Filed Nov. 4, 1939  8 Sheets-Sheet 3
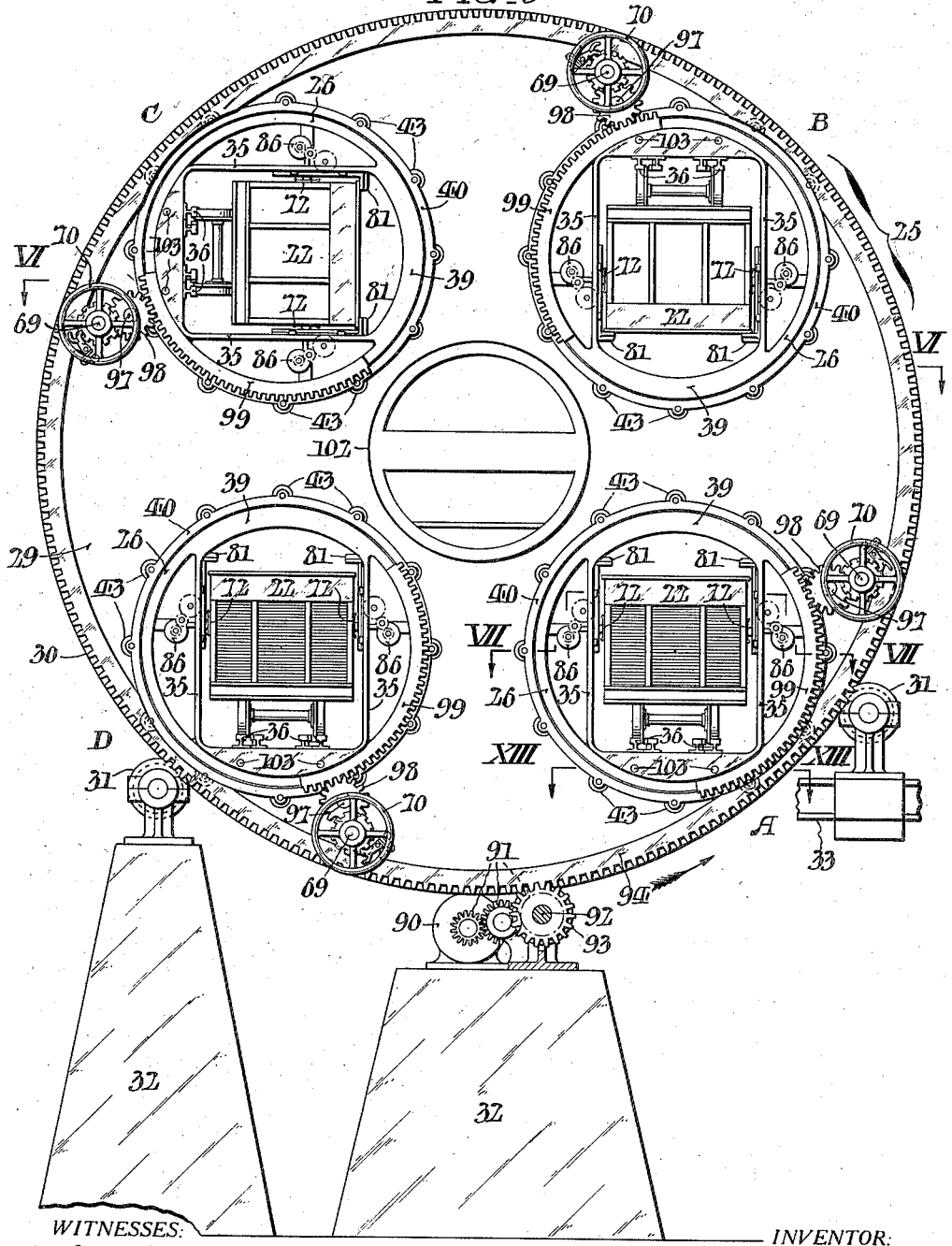
WITNESSES:
Thomas W. Kerr, Jr.
Woodrow Stevenson
INVENTOR:
Lloyd B. Jones,
BY Paul & Paul
ATTORNEYS.

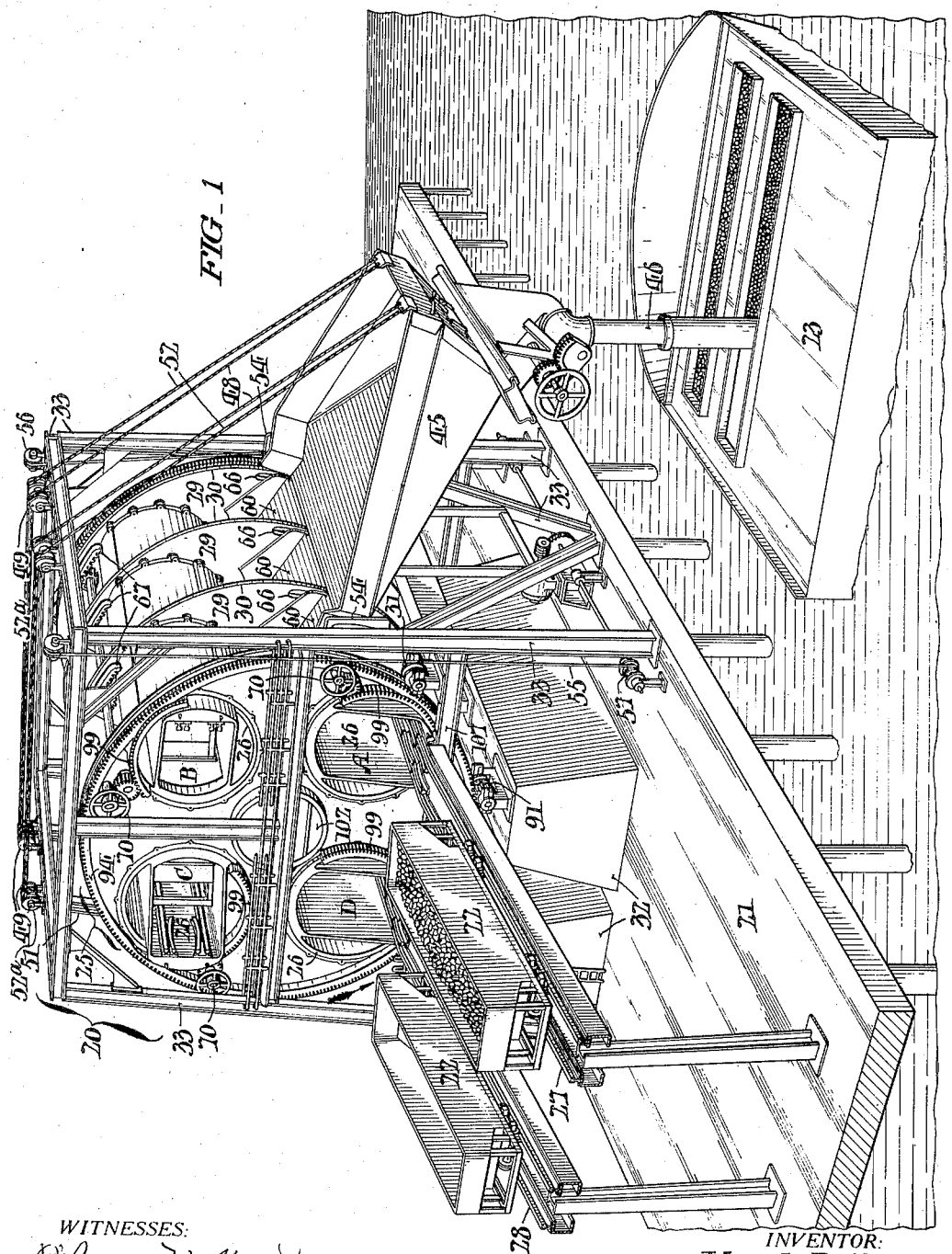

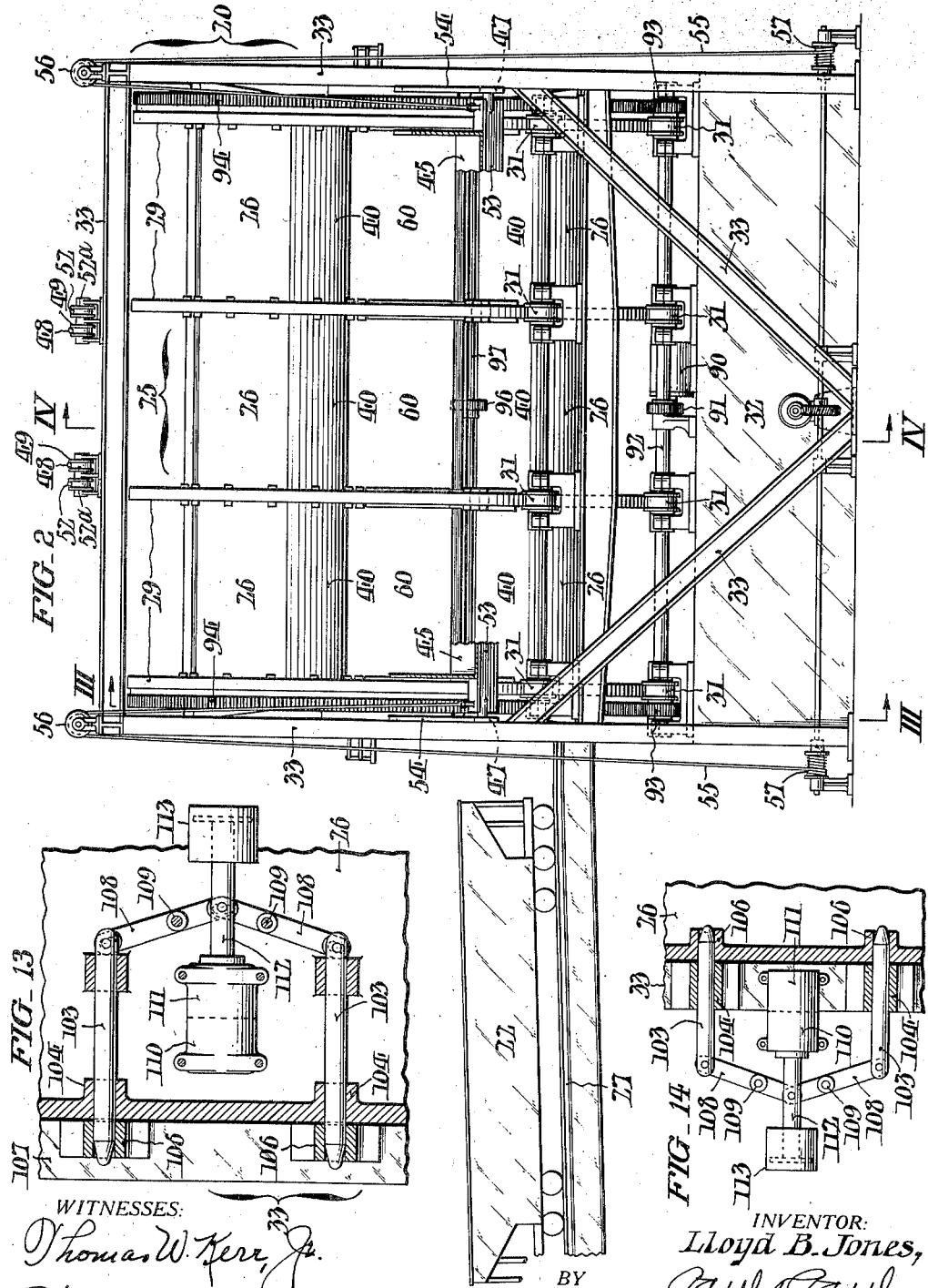

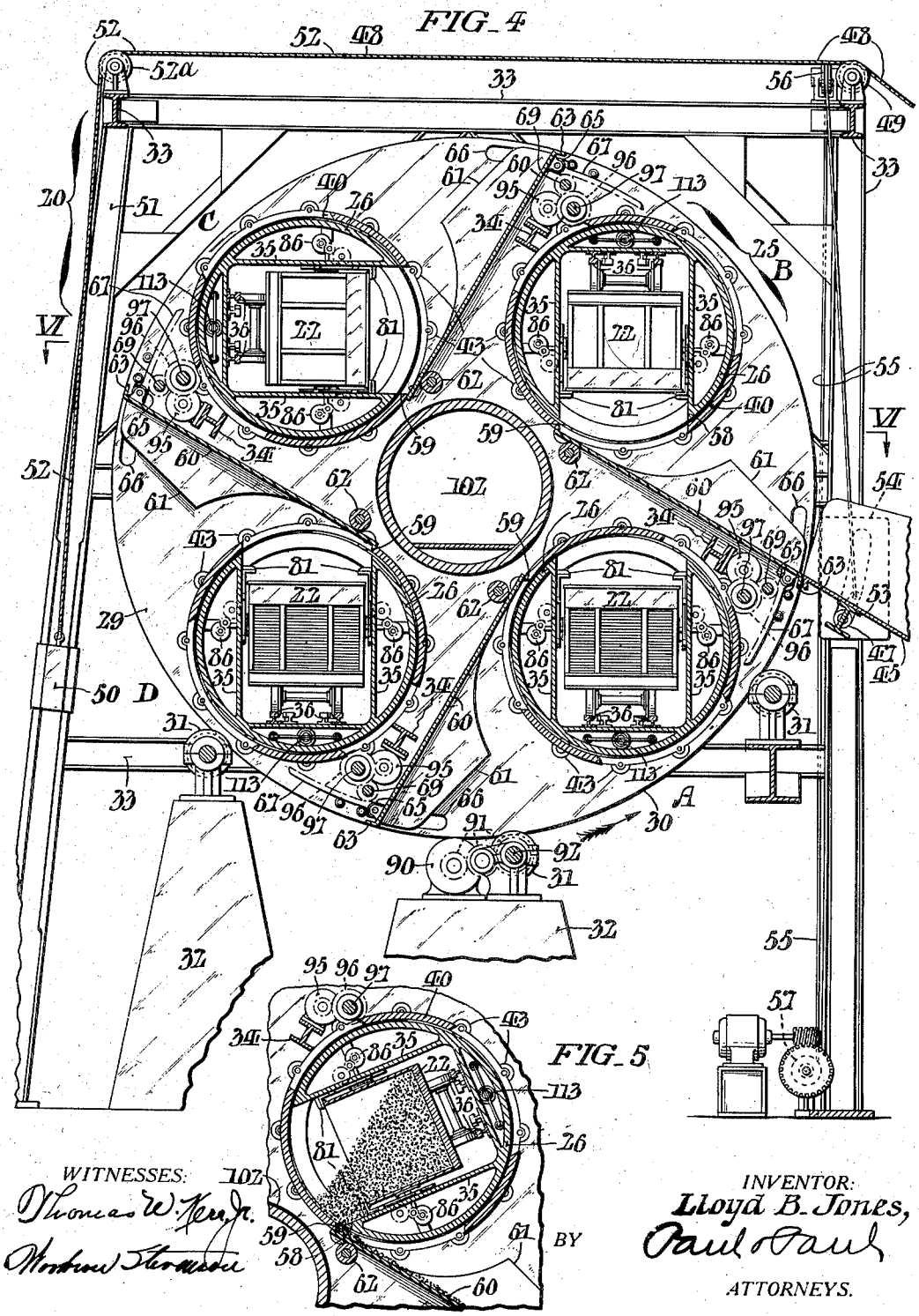

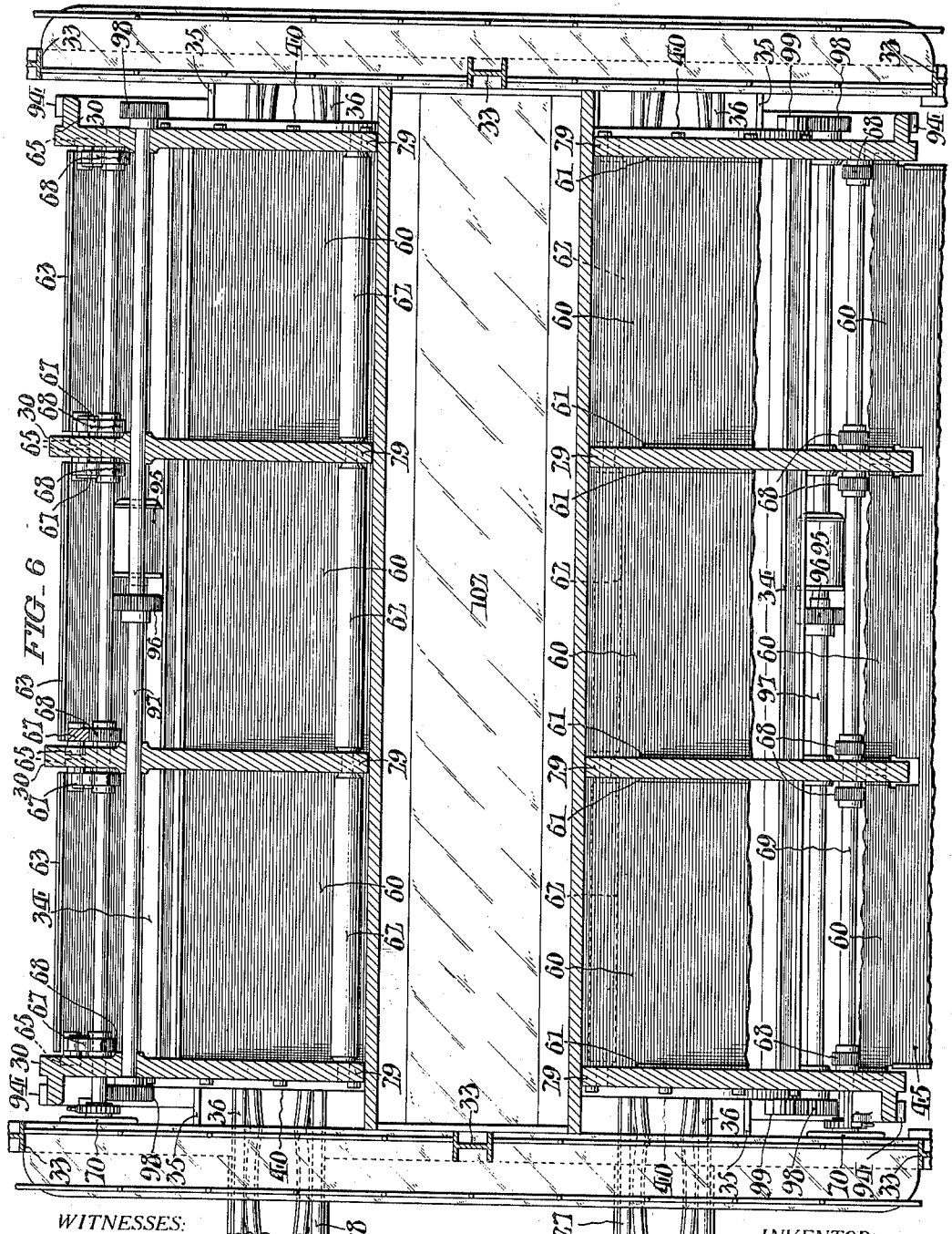

Sept. 24, 1940. L. B. JONES 2,215,735
CAR DUMPING MACHINE
Filed Nov. 4, 1939 8 Sheets-Sheet 6
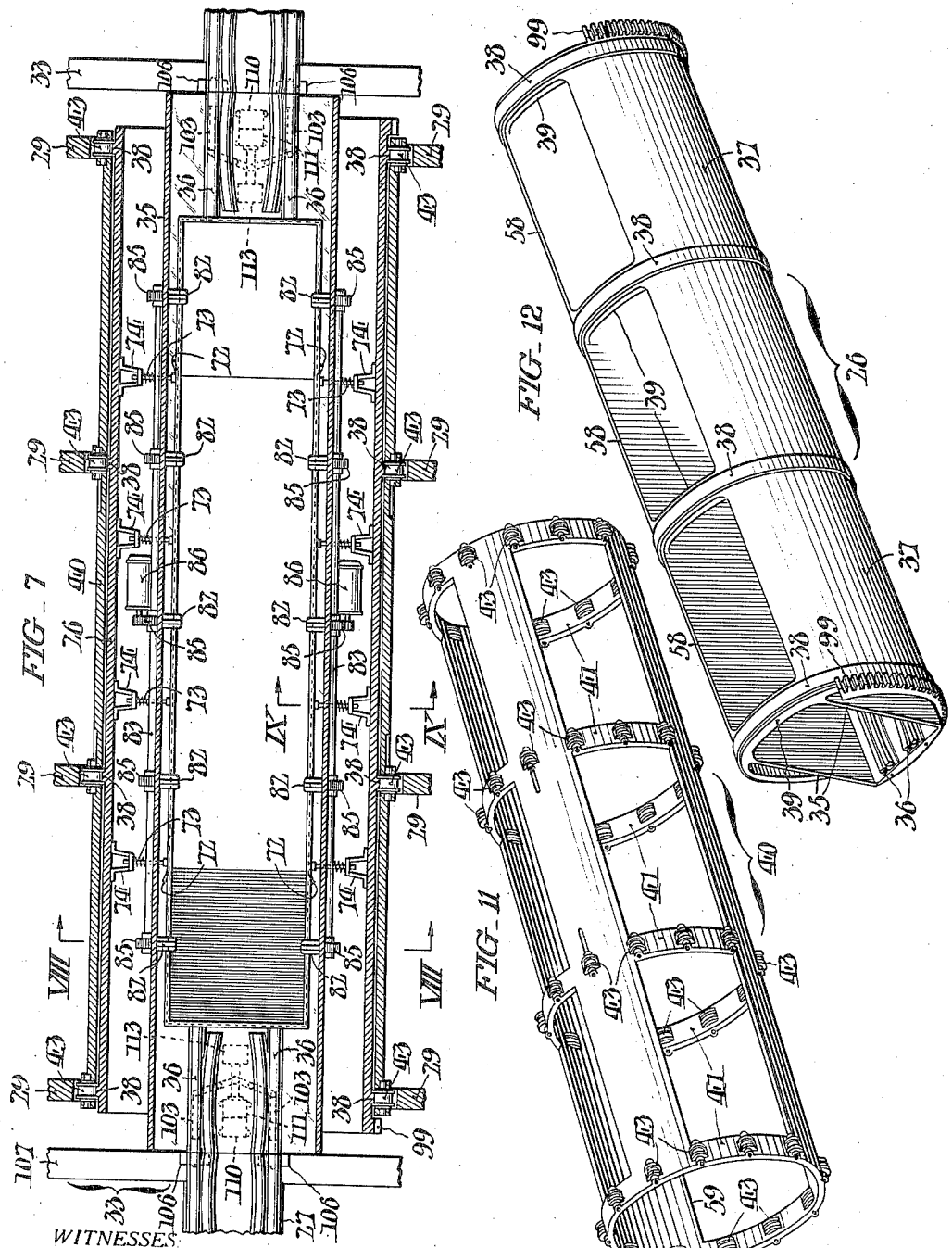

Sept. 24, 1940.　　　L. B. JONES　　　2,215,735
CAR DUMPING MACHINE
Filed Nov. 4, 1939　　　8 Sheets-Sheet 7
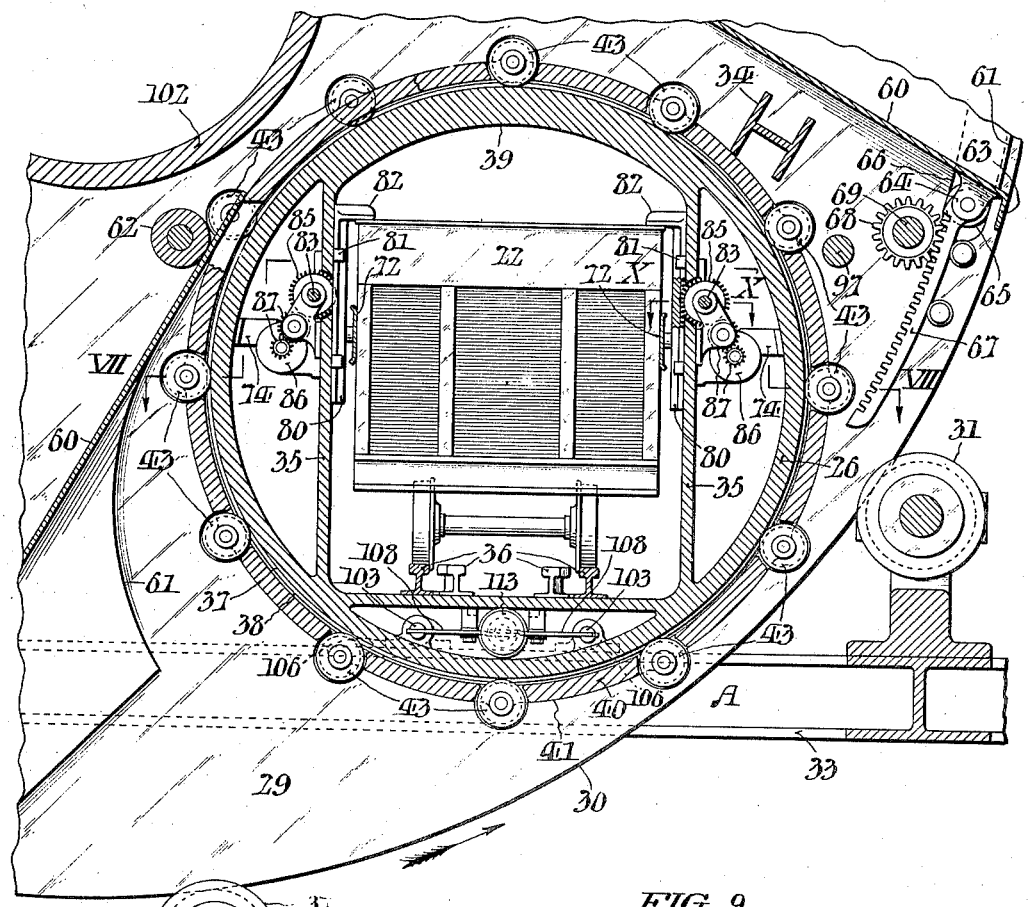
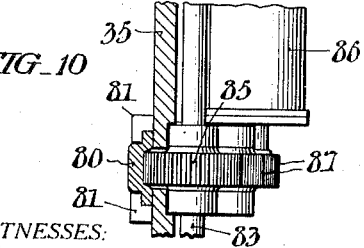
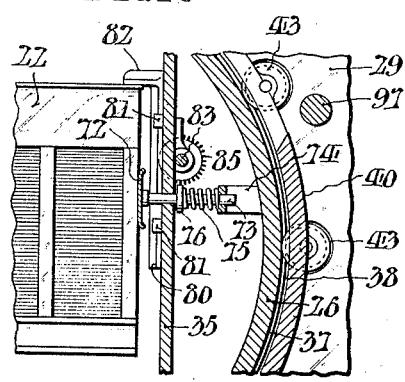
WITNESSES:
INVENTOR:
Lloyd B. Jones,
BY
ATTORNEYS.

Sept. 24, 1940.   L. B. JONES   2,215,735
CAR DUMPING MACHINE
Filed Nov. 4, 1939   8 Sheets-Sheet 8
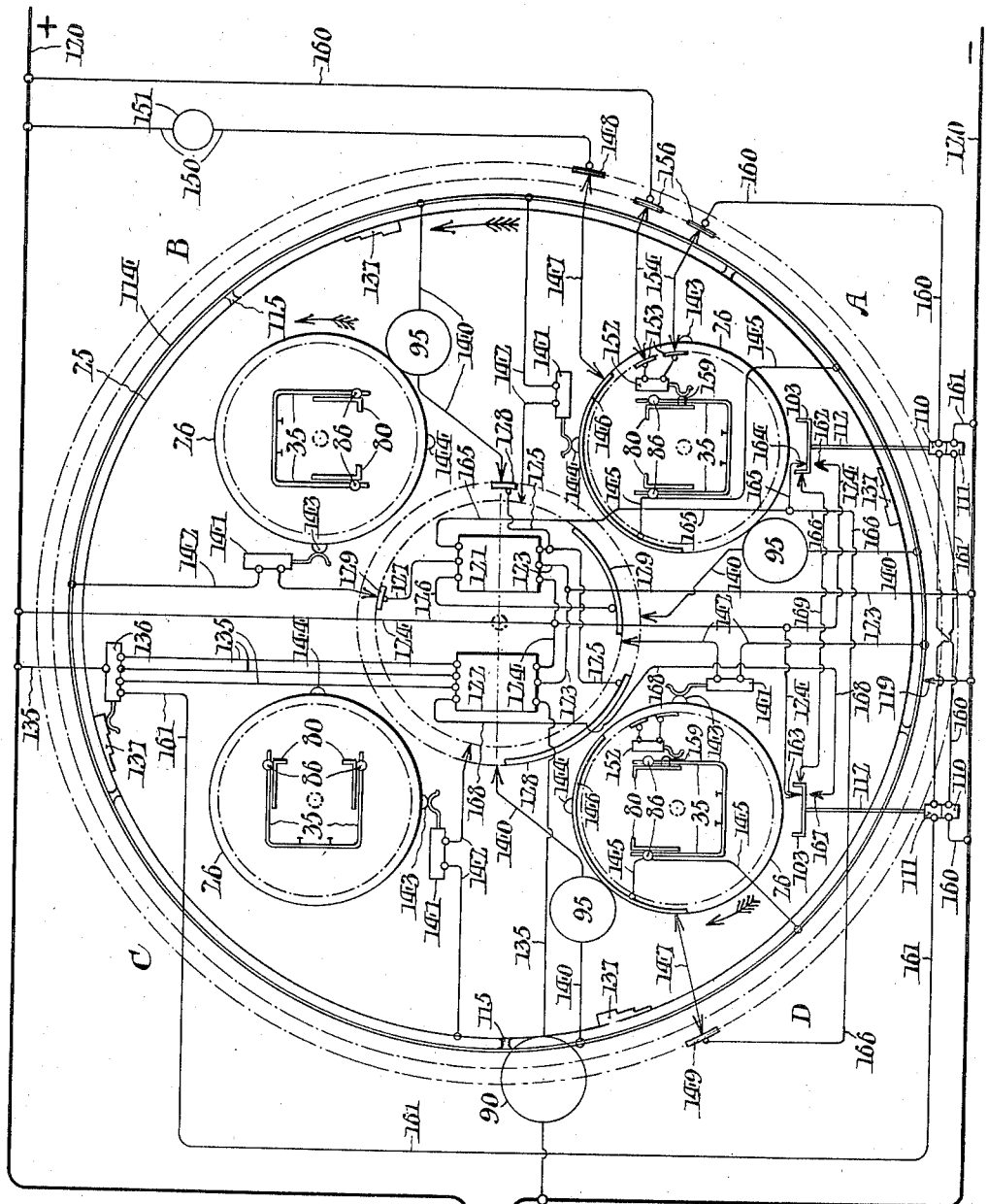
FIG_15
WITNESSES:
INVENTOR:
Lloyd B. Jones,
BY
ATTORNEYS.

Patented Sept. 24, 1940

2,215,735

UNITED STATES PATENT OFFICE 2,215,735

CAR DUMPING MACHINE

Lloyd B. Jones, Altoona, Pa., assignor to The Pennsylvania Railroad Company, Philadelphia, Pa., a corporation of Pennsylvania Application November 4, 1939, Serial No. 302,804

24 Claims. (Cl. 214—52)

This invention relates to dumping bulk lading from cars by turning them over or inverting them more or less completely, and is hereinafter explained with particular reference to the dumping of coal from ordinary gondola cars.

At the present time, coal cars are dumped by a reversing cycle of movements: e. g., the laden car is run from a track into a cradle; the car and cradle are hoisted and inverted to dump the coal into a chute, and are then righted and lowered; and the emptied car is run off the cradle. To avoid delays, the laden car is usually run on at one end of the cradle and the emptied car is run off at the other end,—even though in many cases this requires a "kick-back" track to return the empty car past the dumper.

This cycle of operation involves reversals and back movements which waste time and power; and the cycle is further retarded by measures required to prevent degradation of graded coal in dumping the car by turning it over in such a way as to spill the coal "outward" in the direction of the downward slope of the delivery chute, and from a considerable height above this surface. Such limitations of the present cycle are fundamental, so that there is no hope of material improvement by simply speeding up the movements.

The present invention permits of speeding up operations by a cycle of one-way motion, and of avoiding degradation of dumped coal by turning the car over "inward" so that the coal is progressively "laid down" (as it were) right on the sloping surface of the delivery means, instead of being dropped on it from a height. The cars are handled by a rotating carrier which raises a laden car and lowers an empty car concurrently, thus saving the lowering time that is lost in the reversing cycle, besides reducing the power required by the lifting effect of the descending empty car. Preferably, the rotating carrier employed may have places or "cradles" for four cars, which are successively brought to a car-receiving position or station at a lower level, to an elevated car-dumping station, to an elevated "idle" station, and to a car-discharging station,—which may be on the same level as the receiving station. However, a carrier with just three cradles can be operated with but three stations, by running the laden cars into the carrier cradles at a lower station, dumping the cars at one elevated station, and discharging the emptied cars at another elevated station, by means of an elevated discharge track leading to the empty car yard,—thus doing away with the idle station in the four cradle cycle described above. A carrier with but two cradles can receive and discharge cars at one lower station, where the empty car may be bumped out of the carrier by an incoming laden car, while a preceding laden car is being dumped at the other (elevated) station; but such a carrier may require a kick-back trestle to return the empty car past the dumper. A four cradle or a three cradle machine obviates the necessity for such a kickback arrangement, since emptied cars can be discharged from the same side or end of the carrier at which laden cars are received.

The invention is hereinafter more fully explained in connection with a four cradle type of machine. Various features and advantages of the invention will appear from this description of a species or form of embodiment, and from the drawings.

In the drawings, Fig. 1 is a general perspective view of a four cradle car-dumping machine and installation for the purposes of the invention; Fig. 2 is a side view of the installation from the right of Fig. 1 with certain parts broken away; and Fig. 3 is an end view of the rotary carrier and associated supporting and driving parts, the machine frame-work and the car approach and discharge tracks being omitted, and certain parts being shown in section as indicated by line and arrows III—III in Fig 2, some of them, however, turned 90° from their position in Fig. 1.

Fig. 4 shows a cross-section through the dumping machine taken as indicated by the line and arrows IV—IV in Fig. 2, some parts being turned 90° from their position in Fig. 1; and Fig. 5 is a fragmentary sectional view taken similarly to Fig. 4, but showing one of the car cradles in process of rotation relative to the rotary carrier of the machine to dump the car.

Fig. 6 is a fragmentary plan view of the machine with certain parts in horizontal section as indicated by the line and arrows VI—VI in Figs. 3 and 4.

Fig. 7 shows a fragmentary horizontal section through the machine at one of the car cradles, taken substantially as indicated by the lines and arrows VII—VII in Figs. 3 and 8. Fig. 8 is a fragmentary view showing a section through one of the car cradles and associated parts of the machine, taken as indicated by the line and arrows VIII—VIII in Fig. 7; Fig. 9 is a fragmentary sectional view, taken as indicated by the line and arrows IX—IX in Fig. 7, illustrating the arrangements for sustaining and holding down the car in a cradle; and Fig. 10 is a fragmentary plan and sectional view illustrating the arrangements for operating the clamping means, taken as indicated by the line and arrows X—X in Fig. 8.

Fig. 11 is a perspective view of one of the cell-like cradle-containing and hopper structures of the machine, and Fig. 12 is a perspective view of one of the cradles.

Fig. 13 is a fragmentary plan view of the mechanism for locking one of the cradles and the carrier against rotation, certain parts being in horizontal section as indicated by the line and arrows XIII—XIII in Fig. 3; and Fig. 14 is a similar view illustrating a different arrangement of such mechanism.

Fig. 15 is a diagrammatic wiring diagram illustrating the electrical operating and control system of the machine.

Fig. 1 shows a dumping machine 20 installed on a wharf 21 for the purpose of transferring coal from ordinary gondola cars 22 to the hold of a vessel 23 alongside the wharf. The machine 20 comprises a rotary carrier 25 provided with four rotary car cradles 26, two of which are in lower receiving and discharge positions A, D, at the same level, in line with car supply (or approach) and discharge tracks 27 and 28—here shown as sloping upward somewhat to the cradles—and the other two of which are in elevated positions B, C. As shown in Fig. 7, there is a stationary track to the right or rear of the cradle 26, as well as to the left or front, which may be used for either supply or discharge of cars, if desired for any reason. As shown in Figs. 1, 2, 3, and 4, the rotary carrier structure 25 has a plurality of transverse webs 29 whose edges form or are provided with external circular trackways 30 that rest in peripheral grooves of supporting and centering rollers 31, suitably mounted in bearings on the foundations 32, and on the machine frame 33, so that the carrier 25 may rotate about a substantial horizontal axis. The carrier webs 29 may be interconnected by longitudinals 34 extending from web to web, as shown in Figs. 4, 5, and 8. The car cradles 26 are arranged in quadrant positions concentrically about the axis of rotation of the carrier 25, and are mounted (as hereinafter described) to rotate about substantially horizontal axes parallel with the axis of rotation of the carrier 25.

As shown in Figs. 1, 3, 4, and 12, each cradle 26 has inner walls 35 defining a trough-like tunnel affording room for a car 22, with slight side clearance, and is equipped with a track 36 for the car. Besides the inner walls 35, each cradle 26 may also have a cylindrical outer wall 37 extending around the sides and bottom of the trough-like tunnel 35, but leaving the latter open at the top, Figs. 4 and 12. This cradle structure 26 may be provided with external circular tracks 38 extending entirely around it, and sustained across the open top of the cradle by girders 39. Each cradle 26 is rotatably mounted (with slight clearance) in a cylindrical cell or shell-like hopper structure 40 having in its wall longitudinal openings that are bridged by arcuate wall portions 41, corresponding to the girders 39. In suitable openings in the shell wall 40 are mounted supporting and centering rollers 43, in whose grooves are engaged the tracks 38 of the cradle 26.

As shown in Figs. 1, 2, 3, and 8, the shells 40 extend through openings in the transverse webs 29, and may be secured to these webs to brace and interconnect them. The showing of the inner and outer cradle walls 35, 37 and girders 39 as if autogenously united in the drawings is intended diagrammatically, to indicate their structural attachment, rather than to suggest a cast-metal construction; and the showing of the cell walls 40 and the bridges 41 as if integral is similarly intended.

The dumping position or station B for the cradles 26 is at the upper right in Figs. 1, 3, and 4; and in front of it there is a chute hopper or pan 45 for receiving the dumped coal and delivering it into the hold of the vessel 23 through connections including a chute 46 of telescopic sections. The hopper chute 45 is shown with its upper inner end pivoted at 47 (Figs. 2 and 4) to permit adjustment of its slope, and its outer end is supported by flexible cables 48 that extend over pulleys 49 on the machine frame 33 and are connected to any suitable hoisting-drum mechanism or the like (not shown) for adjusting the chute. The outer end of the chute 45 may be counterbalanced by counterweights 50 arranged to slide up and down along guideways afforded by the rear frame uprights 51, and connected to the chute by flexible cables 52 extending over pulleys 52a on the frame 33, Figs. 1, 2, and 4. The pivots 47 for the hopper chute 45 are preferably adjustable vertically relative to the machine frame 33, and are shown in Fig. 2 as mounted on a longitudinal beam 53 beneath the hopper chute 45, attached to its bottom. The ends of the beam 53 may be guided in any suitable way, as by engagement of the pivots 47 in arcuate guide slots of bracket plates 54 attached to the frame 33. The slots of these bracket plates 54 are shown concentric with the axis of the carrier 25. Any suitable or convenient means may be provided for raising and lowering the beam 53 and the inner end of the hopper 45 relative to the frame 33 and the carrier 25, such as flexible cables 55 extending over pulleys 56 on the top of the frame and attached to winding drums 57 on opposite ends of a common motor-driven shaft.

The cycle of operation of the machine begins with the carrier 25 and its cradles 26 stationary in the positions A, B, C, D shown in Fig. 1, and with the tracks 36 in the two lower cradles 26 aligned with the car supply and discharge tracks 27, 28. The laden car 22 on the supply or approach track 27 is run into the corresponding cradle 26 at station A and is properly located and secured therein, as indicated in dot and dash lines in Fig. 1, and as shown in Fig. 7. Concurrently, an empty car 22 which has been dumped in the previous cycle of operation may be run out of the other lower cradle 26 at station D on to the discharge track 28, as shown in Fig. 1.

The carrier 25 is then rotated 90° counterclockwise, as shown by the arrows in Figs. 1, 3 and 4, bringing the cradle 26 containing the loaded car into the upper right-hand position B shown in Fig. 1. As this cradle 26 does not turn relative to the carrier 25 during this quarter turn of the latter, the loaded car 22 in the cradle in question is turned half over (on its side) when it reaches the position B as shown in Fig. 1. The carrier 25 being stopped after this quarter turn and held stationary, the cradle 26 in the upper right-hand dumping position B of Fig. 1 is turned counterclockwise 90° relative to the carrier 25, which completes its inversion upside down as shown in Figs. 3 and 4. As this quarter turn of the cradle 26 relative to the carrier 25 begins—or even somewhat before, during the latter part of the preceding quarter turn of the carrier 25— the lading in the car 22 in this cradle starts to spill out against the side wall of the cradle and the wall of the shell 40, which thus serves as a hopper for receiving the coal; but until the cradle reaches the position illustrated in Fig. 5, where the upper edge 58 of the cradle passes the edge 59 of the shell opening which is then directed downward, the lading is retained in the cradle and shell, which coact like a rotary valve and valve-seat. However, as the cradle edge 58 passes the shell edge 59 as shown in Fig. 5, the lading begins to run through the widening opening onto a sloping apron 60 which serves as an upward extension of the hopper 45 between the carrier webs 29. Thus the car lading is, as it were, gently and progressively laid down on the hopper shell wall 40 and on the upper portion of the apron 60, without any substantial free fall, so that it is not broken up or degraded appreciably. By the time the cradle 26 reaches or approximates the inverted position shown in Figs. 3 and 4, substantially all the car lading has thus been dumped, and has run down the apron 60 into the hopper 45.

During two succeeding quarter turns of the carrier 25 counterclockwise, the car 22 which has just been inverted and emptied at the dumping station B (as above described) is first brought to a corresponding station C on the same upper level at the left of Figs. 1, 3, and 4, where it is on its side, and is then brought to the discharge station D at the lower left in Fig. 1, where it is completely righted, ready to be run out on the discharge track 28. Of course it will be understood that at each quarter turn of the carrier 25, while it is stationary for the dumping of one car 22, another car 22 is run from the track 27 into the cradle 26 then at the receiving station A underneath the dumping station B, and a previously dumped car is run out of the cradle 26 at the adjacent lower discharge station D on to the track 28; so that four cars 22 are dumped at each full 360° revolution of the carrier 25.

Referring, now, to Figs. 2, 4, and 6, as well as to Fig. 1, it will be seen that the apron 60 is made in sections corresponding to and substantially filling the spaces between the transverse carrier webs 29, and that each section has upturned margins or sides 61 adjacent the webs 29. As best shown in Fig. 4, the inner upper margin of the apron plate 60 bears upon an anti-friction roller 62 rotatably mounted between the webs 29, and engages under the lower corner 59 of the shell 40. The outer edge of the apron 60 is reinforced with a down-turned lip 63, and each lower corner of the apron carries brackets 64 to which are attached rollers 65 that engage in arcuate grooves 66 in the webs 29, concentric with the axis of rotation of the carrier 25. To control the flow of the coal or other lading according to its particle size and characteristics, it may be desirable to alter the slope which the aprons 60 have when in dumping position relative to the associated cradles 26; and this may be done by moving the outer apron edges 63 one way or the other along the peripheries of the carrier webs 29, as permitted by the engagement of the rollers 65 in grooves 66. For this purpose, an arcuate rack bar 67 may be pivoted to each apron bracket 64, and the rack bars 67 for all the aprons associated with each cradle 26 may coact with corresponding toothed pinions 68 fast on a shaft 69 extending the full length of the carrier 25, through bearings on its various webs or diaphragms 29. As shown in Figs. 1 and 3, hand wheels 70 are mounted on the ends of each shaft 69 for turning it to adjust the slope of the corresponding aprons 60.

Suitable provisions for holding the cars 22 in the cradles 26 are shown in Figs. 7, 8, 9, and 10. As shown in Figs. 7, 8, and 9, there are longitudinal holding or buffer bars 72 at either side of the cradle tunnel 35 for engaging the sides of the car 22 and holding it in proper position transversely of the tunnel. These bars 72 may be supported by studs 73 extending through the tunnel sides 35 and through supporting brackets 74 mounted on the outer cradle walls 37. The holding bars 72 may be yieldingly urged inward by sufficiently powerful helical compression springs 75 acting between the brackets 74 and collars 76 fixed on the studs 73, these collars 76 also coacting with the tunnel walls 35 as stops to limit the lateral movement of the bars 72 inward into the tunnel when there is no car in it. As a car enters the tunnel, the car sides engage between the bars 72 and progressively force them apart to admit the car—the friction also serving to absorb more or less of the momentum of the car. For holding the car 22 down on the tunnel track 36, clamp bars 80 may be arranged for up and down movement in guide brackets 81 attached to the tunnel sides. As shown in Figs. 8 and 9, these clamp bars 80 have inward projecting heads 82 for engaging the upper edge of the car body. The clamp bars 80 at each side of the tunnel may be operated by a longitudinal shaft 83 mounted behind the wall 35 in suitable bearing brackets, and equipped with toothed pinions 85 projecting through suitable openings in the walls 35 and meshing with rack teeth on the backs of the clamp bars 80. The clamp actuating shaft 83 may be driven by reversible (brake-equipped electric) motors 86 mounted on the rear sides of the walls 35, through suitable toothed gearing 87. When a car 22 is run into a cradle 26 and is properly centered longitudinally therein between the spring actuated bars 72 bearing on its sides, the motors 86 are operated to bring the clamps 80 into engagement with the upper edge of the car body along both sides and hold the car down on the track 36; while when the car has been dumped and is at the discharge station ready to be run out of the cradle on the discharge track 28, the motors 86 are reversely operated to release the clamps. It will be understood that the clamps 80 are tightened on a car 22 while the car springs are compressed by the weight of its lading, so that as the car is inverted and emptied, it is firmly held between the clamps and the track 36.

For rotating the carrier 25, a (braked electric) motor 90 is shown (Figs. 2 and 3) mounted on the foundation 32, and connected through tooth gearing 91 to a longitudinal shaft 92 that extends the length of the machine in bearings on said foundation and has on its ends toothed pinions 93 in mesh with annular toothed rack flanges 94 attached to the end webs 29 of the carrier 25, beside their tracks 30 (Fig. 6). When the motor 90 is stopped and braked, the carrier 25 is held or locked against rotation by the pinions 93 meshing with the racks 94.

For rotating each cradle 26 counterclockwise relative to the carrier 25, when it is in dumping position, and for reversely rotating it during its travel from car-discharging position to car-receiving position, as shown in Fig. 1, a reversible (braked electric) motor 95 is shown mounted about mid-length of the carrier 25, on a longitudinal 34, with connection through toothed gearing 96 to a longitudinal shaft 97 extending the length of the carrier (through bearings on its transverse webs 29), and having on its ends toothed pinions 98 which mesh with toothed racks 99 on the ends of the cradles 26. When the motors 95 are stopped and braked, the cradles 26 are held or locked against rotation, relative to the carrier 25, by the pinions 98 meshing with the cradle racks 99. The motors 95 may be controlled manually and automatically (as hereinafter explained) by automatic motor control means preferably installed in a stationary cylindrical drum 102 extending through central openings in the webs 29 and attached at its ends to the machine frame 33.

Provision is preferably made to hold the carrier 25 stationary in just the right position during its pause after each quarter-turn, and to hold the cradles 26 at the car-receiving and car-discharging stations exactly upright, properly aligned with the car supply and discharge tracks 27, 28. As shown in Figs. 7, 8, and 13, longitudinal sliding bolt bars 103 with tapered outer ends are mounted in bearings 104 on the end structure of each cradle 26. To lock the cradles 26 and the carrier 25 against turning, the bolt bars 103 are projected outward from the cradle into openings of sockets 106 on a member 107 of the machine frame 33. As shown in Fig. 13, the bolt bars 103 have pin and slot connections with the outer ends of actuating rocker levers 108 fulcrumed at 109, and are pushed outward into the part 106 to lock or drawn inward into unlocking position by suitable motor means, such as solenoids 110, 111 mounted on the cradle 26 and having a core bar 112 connected to the overlapping ends of the levers 108 by a pin and slot connection, and connected to a (dash pot) retarder 113 for retarding the locking movement of the bars 103.

Fig. 14 illustrates a reversed arrangement of the cradle and carrier locking means, in which the bolt bars 103, their bearings 104, and their actuating solenoids 110, 111 are mounted on the stationary supporting structure for the tracks 27 and 28, while the sockets 106 for the bolts 103 are on the end structures of the cradles 26. Other parts 108, 109, 112, 113 are marked with the same reference numerals as in Fig. 13, as a means of dispensing with repetitive description. This arrangement has the advantage that only two sets of the locking devices 103 and associated parts are necessary, as against four sets in the Fig. 13 arrangement.

To insure against accidents or operating difficulties, the operations of clamping and unclamping the cars 22 in the cradles 26, locking and unlocking the cradles 26 and the carrier 25 as against rotation, rotating the cradles 26, and rotating the carrier 25 are preferably so coordinated or interlocked that they can only be performed under proper conditions and in proper sequence, which may be done by interlocking control of the corresponding electromotive means and devices. A suitable electrical system is diagrammatically illustrated in Fig. 15, where various mechanical parts and features of the mechanism above described are represented in diagrammatic simplified forms and are marked with the same reference characters as in Figs. 1-14.

In Fig. 15, the rotary carrier 25 (represented by the innermost large full line circle) carries a contact ring or bus bar 114, insulatively mounted thereon by suitable supporting means 115, and connected through a fixed brush or contact 119 to one side (the negative side) of the power supply circuit 120. With the machine 25 are associated stationary automatic remote control motor panels 121, 122 (conveniently mounted in the central stationary drum 102 shown in Figs. 1, 3, 4, and 5, but not in Fig. 15) which are connected by leads 123, 124 to the two sides of the power circuit 120. The controller 121 is also connected, by leads 125, 126, 127, to stationary contact segments 128 and 129 which cooperate with brushes or contacts mounted on the rotary carrier 25 and travelling with it, as indicated by the dot and dash circles surrounding the controllers 121 and 122. Other outside connections from stationary parts or circuits to those moving with the rotary carrier 25 may be made by means of stationary contacts mounted adjacent the carrier 25 and coacting brushes or contacts mounted on the carrier 25 and moving with it, as indicated by the dot and dash circles surrounding the contact ring 114, and described hereinafter. Similarly, contact segments and coacting brushes or contacts are provided for making or maintaining connection between parts or circuits moving with the cradles 26 and parts or circuits on the carrier 25. The motors 90 and 95 for rotating the carrier 25 and the cradles 26 are represented in Fig. 15 (as well as their operative connections to said carrier and cradles) by circles tangent to the circles representing the carrier and the cradles. The smallest dot and dash circles (between the controllers 121, 122, and concentric with the cradles 26) indicate the centers of angular or rotary motion of the carrier 25, and of the cradles 26 relative thereto.

Fig. 15 shows the cradles 26 at the same stations A, B, C, and D shown in Figs. 1, 3, and 4, and in the main shows only the electric circuits and features which come into operation at the respective stations A, B, and D, since the station C is an "idle" station, where nothing happens. The main motor 90 for rotating the carrier 25 is connected in a circuit 135 extending from one side of the main power circuit 120 (the negative side) through the controller 122 and a multiple-action limit switch 136 to the other side of the main circuit 120. The limit switch 136 is actuated by one of the three-step cams 137 on the carrier 25 whenever the cradles 26 approach the stations A, B, C, and D during movement of the carrier; and it first slows the rotation of the carrier 25 by two successive reductions of speed, and then stops it with the cradles at these stations. As shown, the portion of the circuit 135 between the controller 122 and the limit switch 136 is trebled, to provide for this step-by-step stopping of the carrier by the limit switch 136. Each motor 95 for rotating a cradle 26 is connected in a circuit 140 between the contact ring 114 and a brush which engages one of the segments 128 connected to the controller 121. When the corresponding cradle 26 is at the station B or is on its way from the station D to the station A, operation of each motor 95 is also controlled by a (limit) switch 141 connected in a circuit 142 between the contact ring 114 and a brush which coacts with one of the segments 129 connected to the controller 121. Each switch 141 is actuated to open the circuit 142 and stop the motor 95 by a cam projection 143 and 144 on the corresponding cradle 26, which engages the switch when a cradle has rotated 90° counterclockwise at the station B, or 90° clockwise between the stations D and A—"counterclockwise" and "clockwise" here referring to the direction of rotation of the device as seen in Fig. 15. Each motor 86 for operating one of the cradle clamps 80 is connected in a circuit 145 between the contact ring 114 and a contact segment 146 on the corresponding cradle 26, which engages a brush connected to a lead 147 which is in turn connected to a brush that engages a stationary contact 148 or 149 when the cradle is at the station A or D. The contact 148 at station A is connected by a lead 150 including a self-opening push button starting switch 151 to one side (the positive side) of the power circuit 120. Operation of each motor 86 is also controlled by a switch 152 connected in circuit between contacts 153, 153 on the corresponding cradle 26, which engage brushes connected by leads 154, 154 to brushes that engage stationary contacts 156, 156 when this cradle is at the station A. The switches 152 are normally closed, but are opened by cam projections 159 on the corresponding clamps 80 when the latter are unclamped at station D.

The locks 103—which serve to lock the carrier 25 against rotation, as well as to lock the cradles 26, 26 against turning at the stations A and D—are operated to unlock by electro-motive means 110, and to lock by electro-motive means 111, as already mentioned. The electromotive means 110 at the stations A and D are connected (in series with one another) across the power line 120, in a circuit 160 which also includes the circuit 154, 154 and that cradle-clamp-switch 152 which is at the time connected in this circuit 154, 154, so that the electro-motive devices 110 and this switch 152 are in series. The electro-motive means 111 at stations A and D are connected (in series with one another) across the power line 120 in a circuit 161 that includes part of circuit 135 and also make and break contacts of limit-switch 136 additional to those hereinbefore referred to. The locking movement of the locks 103 by the electro-motive means 111 should be made sluggish or retarded (as by the dash pot 113 in Fig. 14) to prevent them from engaging the sockets 106 before the carrier 25 comes fully to rest. As here shown, the locks 103 at stations A and D coact with contacts 162, 163 that are connected (as by extension of the lead 124) to one side (the positive side) of the power circuit 120. Thus when the lock 103 for the cradle 26 at station A unlocks, it makes connection to the lead 124, and vice versa; and when the lock 103 for the cradle 26 at station D locks, it makes connection to said lead 124, and vice-versa. The lock 103 at station A also coacts with a contact 164 which is connected by a lead 165 to the controller 121, and through a lead 166 and the lead 147 to the clamp motor circuit 145 of the cradle at station D; and when the station A lock 103 locks, connection is made to said leads 165 and 166, and vice versa. Hence when the locks 103 are locked as shown in Fig. 15, the control panel 121 is energized, which in turn energizes the cradle motor 95 at station B through the circuits 125 and 140; but when the locks 103 are unlocked, the motor 95 cannot be energized. The lock 103 at station D also coacts with a contact 167 that is connected by a lead 168 to the controller 122; and when this station D lock 103 unlocks, connection is made to lead 168, and vice versa. Through a lead 169 and suitable contacts or connections, the locks 103, 103 at stations A and D are always interconnected; so that any circuits at any time connected to either of these locks 103, 103 are at the same time connected to all the circuits then connected to the other lock 103. This circuit 169 is included in the circuit for operating both the unlocking electro-motive devices 110 and the locking electro-motive devices 111.

With the parts and circuits in the positions and connected as shown in Fig. 15, a cycle of operation of the electric control system and of the machine may be described as follows:

Assuming that an empty car has been discharged from the cradle 26 at station D in any suitable way, and that a loaded car has been placed in the cradle 26 at station A in any suitable way, the operator starts the machine by pressing the starting button 151, thus initiating one complete cycle of operations, which goes on automatically without any necessity for the operator to continue holding down the starting button.

The immediate effect of pressing the button 151 is to close a circuit through the leads 150 and 147, the contact segment 146 of the cradle 26 at station A, and the corresponding circuits 145 for the cradle clamp motors 86, which move down or "set" the cradle clamps 80 on the loaded car in this cradle, as shown in Fig. 14. These cradle clamp motors 86 are, of course, stopped by their own limit switches, not shown. In their downward movement, the cradle clamps 80 actuate the corresponding switches 152, and current passes through the circuit 160 and energizes the electro-motive devices 111 for the cradle locks 103 at stations A and D which unlock, leaving both cradles 26 and the carrier 25 free to rotate. In their unlocking movement, the locks 103, 103 at stations A and D make contact at 162 and 167, which energizes control panel 122 through circuits 124, 169 and 168. This in turn results in energization of circuits 124 and 135 and carrier motor 90, which rotates the carrier 25 counter-clockwise 90° until the cam 137 which is at the right of Fig. 15 acts on the limit switch 136 to slow down and stop the carrier 25. The cradle 26 which was initially upright at station A is now on its side at station B, as shown in Fig. 1, and all the other cradles 26 have likewise been advanced one station. Besides thus stopping the carrier 25, the limit switch 136 energizes the circuit 161 and the electro-motive devices 112 at stations A and D, which results in throwing the locks 103, 103 at these stations to lock the corresponding cradles 26 and the carrier 25. This results in energizing the circuit 124 and brings into operation the motor 95 for the cradle 26 now at station B, which rotates this cradle 90° counterclockwise to the position shown in Fig. 15, completely inverting and dumping the car in this cradle. The rotation of this cradle 26 at station B is stopped by its switch 141, which opens the circuit 142. As will be apparent from Fig. 15, the car in this cradle 26 at station B is left in position to be righted during the two succeeding counterclockwise quarter turns of the carrier 25, which bring this cradle to station D.

The locking movements of the cradle locks 103, 103 at station A and D, as above described, result in energizing the circuits 166, 147, 145 and thus operating the motors 86 for the clamps 80 of the cradle 26 at station D, raising these cradle clamps 80 and releasing the empty car in this cradle. Thereafter, these clamps 80 remain raised until a loaded car is placed in this cradle at station A, as described above.

While the cradle containing the loaded car is traveling from station A to station B, as above described, the cradle 26 at station C containing the car last previously dumped at station B travels to station D, and the empty cradle at station D travels to station A. While this is happening, the brush of the circuit 142 for this cradle comes in contact with the lower fixed contact segment 129, which brings the controller 121 into action to operate the corresponding motor 95 in reverse, so as to rotate the cradle 26 at station D 90° clockwise during its travel from station D to station A, so that when it reaches station A, the car in it stands upright. This clockwise rotation of this cradle 26 is stopped by the corresponding switch 141, which is actuated by the cam projection 144 of this cradle. When the rotation of the carrier 25 brings this cradle 26 to the station A, it is stopped by the limit switch 136, and the cradles 26 at stations A and D are locked by the locks 103, as already described. This completes the automatic cycle and leaves the parts in the same situation as at the beginning thereof, ready for removal of a dumped car from the cradle at D and for introduction of a loaded car at station A, and ready for the operator to start another cycle by again pressing the push button 151.

Having thus described my invention, I claim:

1. In car-dumping apparatus, the combination with a carrier revoluble about a horizontal axis, a plurality of car-cradles on said carrier revoluble relative thereto about horizontal axes, to invert and dump cars therein, and a chute adjacent said revoluble carrier for receiving and delivering the dumped coal, of cells on said carrier for its said cradles, relative to which the cradles revolve, and aprons on said carrier extending inward from its periphery between the adjacent cradles and cells, and coacting with the latter in receiving the coal from cars in the cradles, when they are inverted, and transmitting the coal to said chute.

2. In car-dumping apparatus, the combination with a carrier revoluble about a horizontal axis, a plurality of car-cradles on said carrier revoluble relative thereto about horizontal axes, to invert and dump cars therein, a hopper on said carrier for each cradle, relative to which the latter revolves, for receiving the coal as the car in the cradle is dumped and delivering it downward, and a chute adjacent said revoluble carrier for receiving and delivering the dumped coal, of an apron on said carrier under each hopper sloping downward and outward to said chute, when the hopper is in car-dumping position, to receive the coal from the hopper and transmit it to the chute, and means for adjusting the slope and position of said apron relative to the carrier.

3. In car-dumping apparatus, the combination with a carrier having a plurality of car-cradles revoluble relative thereto about horizontal axes, and itself also revoluble about a horizontal axis, means for holding said carrier against rotation, means for holding cradles against rotation relative to said carrier, while the carrier is moving, and a chute adjacent said revoluble carrier for receiving and delivering the dumped coal, of means for rotating car-cradles to invert and dump cars therein while said carrier is held against rotation, aprons on said carrier extending between its adjacent cradles for receiving the coal from cars in the cradles when they are inverted as aforesaid and transmitting the coal to said chute, and means for counter-rotating cradles relative to said carrier while the same is rotating.

4. In car-dumping apparatus, the combination with a carrier revoluble about a horizontal axis, and a plurality of car-cradles on said carrier revoluble relative thereto about horizontal axes, of means for holding car-cradles against rotation relative to said carrier during rotation of the carrier, and means for rotating a car-cradle relative to said carrier while the latter is stationary.

5. In car-dumping apparatus, the combination with a carrier having a plurality of car-cradles revoluble relative thereto in one direction, about horizontal axes, to dump cars in the cradles, and itself also revoluble about a horizontal axis, of means for holding car-cradles against rotation relative to said carrier during rotation of the carrier, and means for counter-rotating a cradle relative to said carrier during rotation of the carrier.

6. In car-dumping apparatus, the combination with a carrier having a plurality of car-cradles revoluble relative thereto in one direction, about horizontal axes, to dump cars in the cradles, and itself also revoluble about a horizontal axis to bring its said cradles to car-receiving and car-discharging positions, of means, actuated by rotation of said carrier to bring a cradle from car-discharging position to car-receiving position, for counter-rotating said cradle during this rotation of the carrier.

7. In car-dumping apparatus, the combination of a carrier revoluble about a horizontal axis; car-cradles on said carrier, in quadrant positions about said axis, themselves revoluble relative to the carrier about horizontal axes; tracks arranged to be concurrently in line with lower positions of adjacent cradles on said carrier, so that an emptied car can be discharged from one of such cradles while a loaded car is introduced into the other; means for holding car-cradles against rotation relative to said carrier during the rotation of the carrier; and means for rotating the cradle directly above that in line with the approach track to invert the car therein that has already been turned on its side by rotation of the carrier to bring said car to this position, so that said car shall be righted during rotation of the carrier in the same direction to bring it in line with the discharge track.

8. In car-dumping apparatus, the combination of a carrier revoluble about a horizontal axis, car-cradles on said carrier, in quadrant positions about said axis, themselves revoluble relative to the carrier about horizontal axes; and tracks arranged to be concurrently in line with lower positions of adjacent cradles on said carrier, so that an emptied car can be discharged from one of such cradles while a loaded car is introduced into the other; of means for holding car-cradles against rotation relative to said carrier during the rotation of the carrier; means for rotating the cradle directly above the cradle in line with the approach track to invert the car therein that has already been turned on its side by rotation of the carrier to bring said car to this position, so that said car shall be righted during rotation of the carrier in the same direction to bring it in line with the discharge track; and means for counter-rotating a cradle during its movement from the discharge track to the approach track, so that it shall come upright into line with the approach track.

9. In car-dumping apparatus, the combination with a carrier having a plurality of car-cradles revoluble relative thereto about horizontal axes, and itself also revoluble about a horizontal axis, of means for holding said carrier stationary, means for holding car-cradles against rotation relative to said carrier during rotation of the carrier, means for rotating a car cradle relative to said carrier while the carrier is held stationary, to dump the car in said cradle, and means for counter-rotating a cradle relative to said carrier during rotation of the carrier.

10. In car-dumping apparatus, the combination with a carrier having a plurality of car cradles revoluble relative thereto about horizontal axes, and itself also revoluble about a horizontal axis to bring its said cradles to car-receiving, car-dumping, and car-discharging position; of means, actuated by rotation of said carrier to bring a cradle containing a loaded car to car-dumping position, for rotating this cradle relative to the carrier to dump the car after the cradle in question reaches dumping position; and means, actuated by rotation of the carrier from car-discharging position of said cradle to car-receiving position thereof, for counter-rotating said cradle during this last-mentioned rotation of the carrier.

11. In car-dumping apparatus, the combination with a carrier having a plurality of car-cradles revoluble relative thereto about horizontal axes, and itself also revoluble about a horizontal axis, and a stationary supporting structure for said revoluble carrier and for car supply and discharge tracks for its cradles, of locking means mounted on said stationary structure and movable into and out of engagement with said cradles, for coacting with the cradles to hold the same against movement relative to the carrier, and said carrier against movement relative to said structure.

12. In car-dumping apparatus, the combination of a carrier revoluble about a horizontal axis, car-cradles on said carrier, in quadrant positions about said axis, themselves also revoluble relative to the carrier about horizontal axes, tracks arranged to be concurrently in line with lower positions of adjacent cradles on said carrier, so that an emptied car can be discharged from one of the adjacent cradles while a loaded car is introduced into another, and a stationary supporting structure for said revoluble carrier and tracks, of locking means on said supporting structure movable into and out of engagement with said cradles, for coacting with car-cradles in line with said supply and discharge tracks to hold said cradles against rotation relative to the carrier, and said carrier against rotation relative to said supporting structure.

13. In car-dumping apparatus, the combination of a horizontally revoluble carrier comprising a plurality of longitudinally spaced transverse webs provided with peripheral trackways; longitudinal cradle-cells extending through and secured to said webs; horizontally revoluble car-cradles in said cells having external trackways; rollers carried by said cells engaging said cradle trackways, and thereby supporting and centering the cradles in said cells; and supporting rollers engaging said peripheral trackways of said webs, and thus sustaining and centering said revolving carrier.

14. In car-dumping apparatus, the combination with a horizontally revoluble carrier comprising a plurality of longitudinally spaced transverse webs provided with peripheral trackways and with toothed racks, and longitudinal cradle-cells extending through and secured to said webs; of horizontally revoluble car-cradles in said cells; supporting rollers engaging said peripheral trackways of said webs, and thus sustaining and centering said revolving carrier; and means for rotating said carrier comprising a shaft with toothed pinions meshing with said racks on said webs, and a motor for driving said shaft.

15. In car-dumping apparatus, the combination with a car-cradle revoluble about a horizontal axis and having side walls defining a car tunnel, of longitudinal side bars extending along at opposite sides of said tunnel for engaging the car sides in said tunnel, and means on said cradle behind its said side walls at intervals in their length for yieldingly pressing said side bars against the car sides, to hold the car in normal position in the cradle when the same is rotated, said side bars being progressively separable, by a car entering the tunnel, to admit the car between them.

16. In car-dumping apparatus, the combination with a carrier revoluble about a horizontal axis, and a car-cradle on said carrier also revoluble relative thereto about a horizontal axis; of car clamps on said cradle movable downward and upward to clamp a car in place on the cradle for dumping, and to release the car; means on said cradle for operating said clamps; and means for rotating said carrier, and for rotating said cradle relative thereto, operatively interlocked with said clamp-operating means, so that the rotating means can only operate when a car is clamped in place on the cradle.

17. In car-dumping apparatus, the combination with a carrier having a plurality of car-cradles revoluble relative thereto about horizontal axes, and itself also revoluble about a horizontal axis to bring its said cradles to car-receiving, car-dumping, and car-discharging positions; of means, actuated by rotation of said carrier to bring a cradle containing a loaded car to car-dumping position, for rotating this cradle relative to the carrier to dump the car after the cradle in question reaches dumping position; means, actuated by rotation of the carrier from car-discharging position of said cradle to car-receiving position thereof, for counter-rotating said cradle during this rotation of the carrier; and means for locking said carrier against rotation itself operatively interlocked with said cradle-rotating and counter-rotating means, so that the latter can only operate when the carrier is locked.

18. In car-dumping apparatus, the combination with a carrier having a plurality of car-cradles revoluble relative thereto about horizontal axes, and itself also revoluble about a horizontal axis, means for clamping cars in place on said cradles and releasing them, means for rotating said carrier, means for rotating said cradles relative to said carrier, and means movable into and out of engagement therewith for holding cradles against rotation relative to said carrier, and for holding said carrier against rotation; of means for operatively interlocking said clamping means and said carrier and cradle holding means, so that said holding means can only be released when cars on cradles are clamped, and vice versa.

19. In car-dumping apparatus, the combination with a carrier having a plurality of car-cradles revoluble relative thereto about horizontal axes, and itself also revoluble about a horizontal axis, means for clamping cars in place on said cradles and releasing them, means for rotating said carrier, means for rotating said cradles relative to said carrier, and means movable into and out of engagement therewith for holding cradles against rotation relative to said carrier, and for holding said carrier against rotation; of means for operatively interlocking said clamping means and said carrier and cradle holding means with said carrier-rotating means, so that said rotating means can only operate when cars on cradles are clamped and the latter and said carrier are released from said holding means.

20. In car-dumping apparatus, the combination with a carrier having a plurality of car-cradles revoluble relative thereto about horizontal axes, and itself also revoluble about a horizontal axis, means for clamping cars in place on said cradles and releasing them, means for rotating said carrier, means for rotating said cradles relative to said carrier, and means movable into and out of engagement therewith for holding cradles against rotation relative to said carrier, and for holding said carrier against rotation; of means for operatively interlocking said cradle-holding means and said dumping means with said cradle-rotating means, so that the latter can only operate when cars on cradles are clamped, and the cradles are released from their holding means.

21. In car-dumping apparatus, the combination with a carrier having a plurality of car-cradles revoluble relative thereto about horizontal axes, and itself also revoluble about a horizontal axis, means for clamping cars in place on said cradles and releasing them, means for rotating said carrier, means for rotating said cradles relative to said carrier, and means movable into and out of engagement therewith for holding cradles against rotation relative to said carrier, and for holding said carrier against rotation; of means for operatively interlocking said clamping means and said carrier and cradle holding means, so that said holding means can only be released when cars on cradles are clamped, and vice versa; and means for operatively interlocking said clamping means and said carrier and cradle holding means with said carrier-rotating means, so that said rotating means can only operate when cars on cradles are clamped, and the latter and said carrier are released from said holding means.

22. In car-dumping apparatus, the combination with a carrier having a plurality of car-cradles revoluble relative thereto about horizontal axes, and itself also revoluble about a horizontal axis, means for clamping cars in place on said cradles and releasing them, means for rotating said carrier, means for rotating said cradles relative to said carrier, and means movable into and out of engagement therewith for holding cradles against rotation relative to said carrier, and for holding said carrier against rotation; of means for operatively interlocking said clamping means and said carrier and cradle holding means, so that said holding means can only be released when cars on cradles are clamped, and vice versa; and means for operatively interlocking said clamping means and said carrier and cradle holding means with said carrier rotating means, so that said rotating means can only operate when cars on cradles are clamped and the latter and said carrier are released from said holding means.

23. In car-dumping apparatus, the combination with a carrier having a plurality of car-cradles revoluble relative thereto about horizontal axes, and itself also revoluble about a horizontal axis, means for clamping cars in place on said cradles and releasing them, means for rotating said carrier, means for rotating said cradles relative to said carrier, and means movable into and out of engagement therewith for holding cradles against rotation relative to said carrier, and for holding said carrier against rotation; of means for operatively interlocking said clamping means and said carrier and cradle holding means, so that said holding means can only be released when cars on cradles are clamped, and vice versa; and means for operatively interlocking said cradle-holding means and said dumping means with said cradle-rotating means, so that the latter can only operate when cars on cradles are clamped and the cradles are released from their holding means.

24. In car-dumping apparatus, the combination with a carrier having a plurality of car-cradles revoluble relative thereto about horizontal axes, and itself also revoluble about a horizontal axis, means for clamping cars in place on said cradles and releasing them, means for rotating said carrier, means for rotating said cradles relative to said carrier, and means movable into and out of engagement therewith for holding cradles against rotation relative to said carrier, and for holding said carrier against rotation; of means for operatively interlocking said clamping means and said carrier and cradle holding means, so that said holding means can only be released when cars on said cradles are clamped, and vice versa; means for operatively interlocking said clamping means and said carrier and cradle holding means with said carrier-rotating means, so that said rotating means can only operate when cars on cradles are clamped, and the latter and said carrier are released from said holding means; and means for operatively interlocking said cradle-holding means and said dumping means with said cradle-rotating means, so that the latter can only operate when cars on cradles are clamped, and these cradles are released from their said holding means.

LLOYD B. JONES.